United States Patent [19]
Kuniyori

[11] Patent Number: 5,621,554
[45] Date of Patent: Apr. 15, 1997

[54] LIQUID CRYSTAL DISPLAY DEVICE HAVING INTERCONNECTING LINES BETWEEN COLUMN ELECTRODES AND METHOD OF DRIVING THE DISPLAY DEVICE

[75] Inventor: Tomoyuki Kuniyori, Fussa, Japan

[73] Assignee: Casio Computer Co., Ltd., Tokyo, Japan

[21] Appl. No.: 360,408

[22] Filed: Dec. 21, 1994

[30] Foreign Application Priority Data

Dec. 31, 1993 [JP] Japan .................................. 5-350767

[51] Int. Cl.⁶ ............................................... G02F 1/1343
[52] U.S. Cl. .......................... 349/139; 349/143; 349/149
[58] Field of Search ................................. 359/54, 87, 88

[56] References Cited

U.S. PATENT DOCUMENTS 4,766,428  8/1988  Clerc et al. ................................ 359/87

FOREIGN PATENT DOCUMENTS 62-189433  8/1987  Japan ...................................... 359/54

Primary Examiner—William L. Sikes
Assistant Examiner—James A. Dudek
Attorney, Agent, or Firm—Frishauf, Holtz, Goodman, Langer & Chick

[57] ABSTRACT

A liquid crystal display device comprises a pair of glass substrates, a driving circuit, and picture sections and arranged in a row. The sections form a first display area, and the sections a second display area. The driving circuit has signal terminals, which are connected by signal lines to the signal terminals of the picture sections. The picture sections have signal terminals located on that side of the first display area which faces away from the driving circuit. The signal terminals of the first display area are connected by interconnecting lines to the signal terminals of the second display area at side of the first and second display area which faces away from the circuit. Thus, the signal lines do not intersect with the interconnecting lines. Therefore, the driving circuit can be mounted directly on one of the glass substrates and can be connected to all display sections by the signal lines, the signal lines and scan lines all provided on the glass substrates.

13 Claims, 8 Drawing Sheets

LIQUID CRYSTAL DISPLAY DEVICE HAVING INTERCONNECTING LINES BETWEEN COLUMN ELECTRODES AND METHOD OF DRIVING THE DISPLAY DEVICE

BACKGROUND OF THE INVENTION

1. Field of the Invention

The present invention relates to a liquid crystal display device having a plurality of display areas, and also to a method of driving the liquid crystal display device.

2. Description of the Related Art

A display device for use in an electric apparatus such as a pager or a calculator has a row of picture sections for displaying a row of characters forming an information item such as a telephone number. FIG. 9 shows one example of display devices of this type. As shown in FIG. 9, this display device comprises a first display area 1, a second display area 2, a driving circuit 3, a circuit board 4, a first flexible substrate 5, a second flexible substrate 6, first row lines 7, a third flexible substrate 8, second row lines 9, and a fourth flexible substrate 10.

Also, the display device comprises a pair of glass substrates and a liquid crystal. The glass substrates are spaced apart from each other, defining a space between them. The liquid crystal is sealed in the space between the glass substrates. The first display area 1 has eight picture sections 1a to 1h which are arranged in a row, spaced at regular intervals. Similarly, the second display area 2 has eight picture sections 2a to 2h which are arranged in a row, spaced at regular intervals. The row constituted by the picture sections 1a to 1h and the row constituted by the picture sections 2a to 2h are arranged, end to end, along a straight line.

Each of the picture sections 1a to 1h and 2a to 2h has eight scan electrodes and five signal electrodes. The scan electrodes are arranged on the first glass substrate, extending parallel to one another at right angles to the row of the picture sections 1a to 1h and 2a to 2h. The direction in which the scan electrodes extend will be referred to as "row direction" hereinafter. On the other hand, the signal electrodes are arranged on the second glass substrate, extending parallel to one another and parallel to the row of the picture sections 1a to 1h and 2a to 2h. The direction in which the signal electrodes extend will be referred to as "column direction" hereinafter. Thus, the eight scan lines intersect at right angles, forming 40 intersections, and the liquid crystal has 40 portions which are sandwiched between the intersecting parts of the signal and scan electrodes which function as pixels.

The driving circuit 3 is a rectangular semiconductor chip which is designed to drive the first display area 1 and the second display area 2. The circuit board 4 is provided near the lower sides of the display areas 1 and 2. The driving circuit 3 is mounted on the circuit board 4.

The driving circuit 3 has signal terminals DS1 to DS40 and scan terminals DC1 to DC16. The signal terminals DS1 to DS40 are provided at the front side of the driving circuit 3, the scan terminals DC1 to DC8 at the left side of the circuit 3, and the scan terminals DC9 to DC16 at the right side of the circuit 3. The signal terminals DS1 to DS40 are connected to the signal terminals PS1 to PS40 of the first display area 1 by the first flexible substrate 5, and also connected to the signal terminals PS41 to PS80 of the second display area 2 by the second flexible substrate 6. The second flexible substrate 6 partly overlaps the first flexible substrate 5 at a region close to the signal terminals DS1 to DS40 of the driving circuit 3. The overlapping part of the second flexible substrate 6 is electrically insulated by an insulating member (not shown) mounted on the first flexible substrate 5.

The first row lines 7 are electrically connected at one end to the scan terminals DC1 to DC8, and at the other end to one end to the third flexible substrate 8. The other end of flexible substrate 8 is connected to the scan terminals PC1 to PC8 of the picture sections 1a to 1h. Similarly, the second row lines 9 are electrically connected at one end to the scan terminals DC9 to DC16, and at the other end to the further flexible substrate 10. The other end of the fourth flexible substrate 10 is connected to the scan terminals PC9 to PC16 of the picture sections 2a to 2h.

In operation, scan signals output from the scan terminals DC1 to DC8 are sequentially supplied to the scan terminals PC1 to PC8 of the picture sections 1a to 1h. At the same time, segment signals are sequentially output from the signal terminals DS1 to DS40 of the driving circuit 3 and supplied to the signal terminals PS1 to PS40 of the picture sections 1a to 1h. The picture sections 1a to 1h of the first display area 1 display characters. Next, scan signals are output from the scan terminals DC9 to DC16 of the display circuit 3 to the scan terminals PC9 to PC16 of the picture sections 2a to 2h. Simultaneously, segment signals are sequentially output from the signal terminals DS1 to DS40 of the driving circuit 3 and supplied to the signal terminals PS41 to PS80 of the picture sections 2a to 2h. The picture sections 2a to 2h of the second display area 2 display characters.

The display circuit 3 needs to have only half the number of signal terminals which are required to make the picture sections 1a to 1h and 2a to 2h display characters. Namely, a single driving circuit suffices to drive two display areas 1 and 2.

In the conventional display device shown in FIG. 9, the signal terminals DS1 to DS40 of the driving circuit 3 are connected to the signal terminals PS1 to PS40 of the first display area 1 by the first flexible substrate 5, and also to the signal terminals PS41 to PS80 of the second display area 2 by the second flexible substrate 6. Inevitably, the lines of the first flexible substrate 5 and those of the second flexible substrate 6 overlap in the vicinity of the signal terminals DS1 to DS40 of the driving circuit 3 to each other. An insulating member must therefore be interposed between the first flexible substrate 5 and the second flexible substrate 6. To connect the signal terminals DS1 to DS40 to the display areas 1 and 2, there are required three components—that is, two flexible substrates 5 and 6 and one insulating member (not shown). Furthermore, it is cumbersome to connect the terminals DS1 to DS40 to the display areas 1 and 2, unavoidably reducing the productivity of the conventional device.

Since the lines of the first flexible substrate 5 intersect with those of the second flexible substrate 6 near the signal terminals DS1 to DS40 of the driving circuit 3, the driving circuit 3 and the display areas 1 and 2 cannot be mounted on the same board. The driving circuit 3 must be mounted on the circuit board 4, while both display areas 1 and 2 must be mounted on another board. Therefore, not only two flexible substrates 5 and 6 are required to connect the signal terminals DS1 to DS40 to the signal terminals PS1 to PS80, but also two other flexible substrates 8 and 10 need to be used to connect the scan terminals DC1 to DC16 of the display circuit 3 to the scan terminals PC1 to PC16 provided in the display areas 1 and 2.

Hence, the conventional display device needs to have comparatively many connecting components and, therefore, be manufactured in many steps. As a consequence, the productivity of the display device is more reduced still.

SUMMARY OF THE INVENTION

The first object of this invention is to provide a liquid crystal display device in which a plurality of picture sections are connected to a driving circuit, without using insulating members or flexible substrates, which therefore comprises a relatively small number of components, and which can be manufactured in a small number of steps and, hence, at high productivity.

The second object of the invention is to provide a method of driving a liquid crystal display of the type described above.

To attain the first object, a liquid crystal display device according to the invention comprises a display panel and a driving circuit for applying control voltages to first and second sets of row electrodes and first and second sets of column electrodes. The display panel includes: a first substrate on which are mounted the first and second sets of column electrodes; a second substrate which faces the first substrate, defining a space together with the first substrate, and on which are mounted the first and second sets of row electrodes; a liquid crystal filled in the space between the first and second substrates; a sealing member bonding the first and second substrate to each other and sealing the liquid crystal in the space between the first and second substrates; a first display area defined by those portions of the liquid crystal which are located at intersections of the row electrodes of the first set and the column electrodes of the first set; a second display area defined by those portions of the liquid crystal which are located at intersections of the row electrodes of the second set and the column electrodes of the second set; a first set of row lines connecting the driving circuit to the row electrodes of the first set at one end of the first display area; a second set of row lines connecting the driving circuit to the row electrodes of the second set at one end of the second display area; a plurality of column lines connecting the driving circuit to a first side of the column electrodes of the first set, the first side facing the driving circuit; and a plurality of inter connecting lines connecting a second side of the column electrodes of the first set to the column electrodes of the second set, at a second side of the first and second display areas, the second side facing away from the driving circuit.

To achieve the second object described above, a method of driving a liquid crystal display device, according to this invention, comprises the steps of: providing a driving circuit for applying row voltages to a plurality of row electrodes and column voltages to a plurality of column electrodes; providing a display panel having a first substrate on which are mounted the column electrodes, a second substrate which is spaced from the first substrate and on which are mounted the row electrodes, a liquid crystal filled between the first and second substrates, to be orientated by voltages applied between the row and column electrodes, a first display area defined by those portions of the liquid crystal which are located at intersections of some of the row electrodes and some of the column electrodes, a second display area defined by those portions of the liquid crystal which are located at intersections of others of the row electrodes and others of the column electrodes, a first set of row lines connecting the driving circuit to the row electrodes of the first set at one end of the first display area, and a plurality of interconnecting lines connecting some of column electrodes to the others of the column electrodes at that side of the first and second display areas which faces away from the driving circuit; applying the row voltages from the driving circuit to the some of the row electrodes and to the others of the row electrodes, alternately; applying the column voltages from the driving circuit to the some of the column electrodes as the row voltages are applied to the some of the row electrodes; and applying the column voltages from the driving circuit to the others of the column electrodes through the some of column lines and the interconnecting lines as the row voltages are applied to the others of the row electrodes.

In the present invention, the control voltage from the driving circuit is applied via the first-row lines and the second-row lines to the first-row electrodes of the first display area and the second-row electrodes of the second display area, and via the column lines to the column electrodes of the first display area. Some of the column electrodes, which are located at that side of the first display area, facing away from the driving circuit, are connected by the interconnecting lines to the other column electrodes of the second display area. Thus, the display device is able to display a variety of pictures since the first-row lines, the second-row lines and the column lines do not contact.

Besides, the picture sections can be electrically connected to the driving circuit, without using insulating members or flexible substrates. The liquid crystal display device therefore comprises a relatively small number of components. The device can be manufactured in a small number of steps and, hence, at high productivity.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 9:
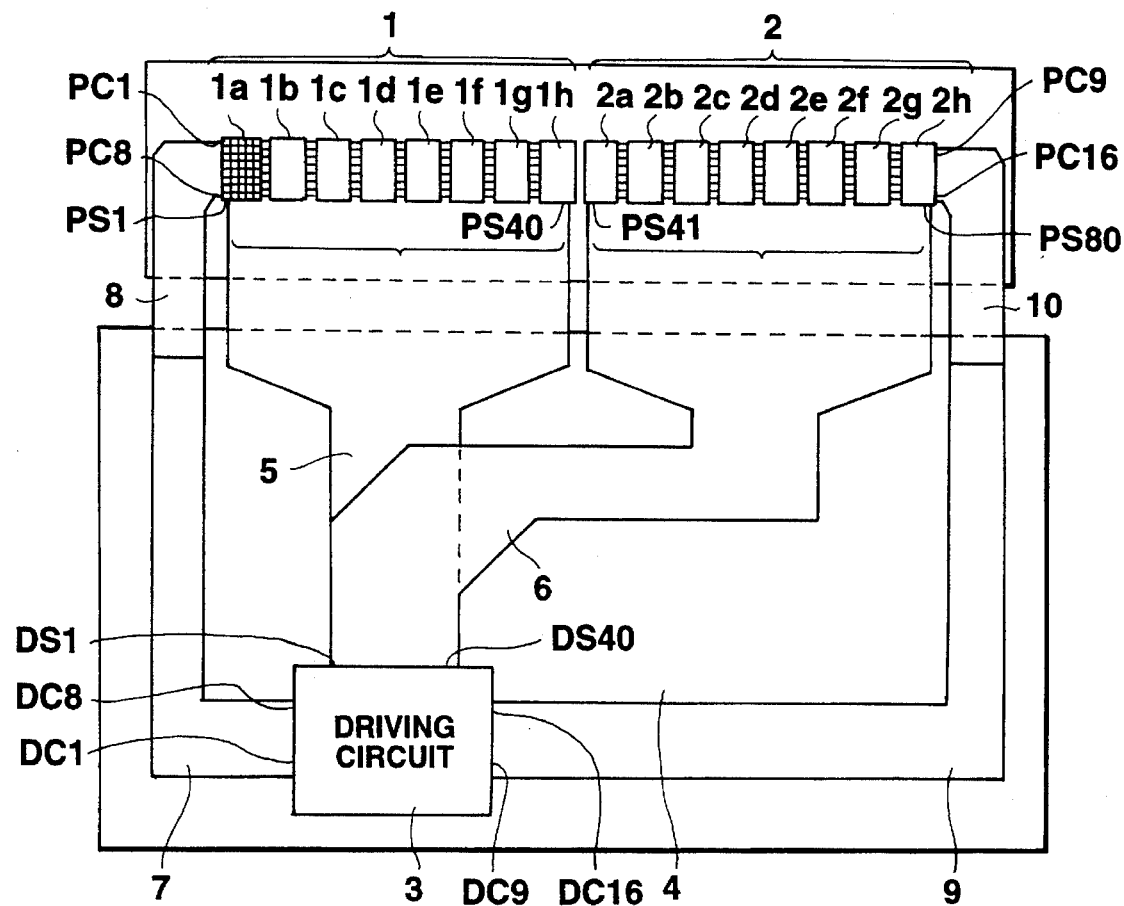
FIG. 9 is a schematic diagram showing a conventional liquid crystal display device.

The liquid crystal display device which is the first embodiment of the invention will be described, with reference to FIGS. 1 to 6. Those of the components of the first embodiment, which are similar or identical to those of the conventional device shown in FIG. 9, are designated by the same numerals in FIGS. 1 to 6 and will not be described in detail.

Figure 1:
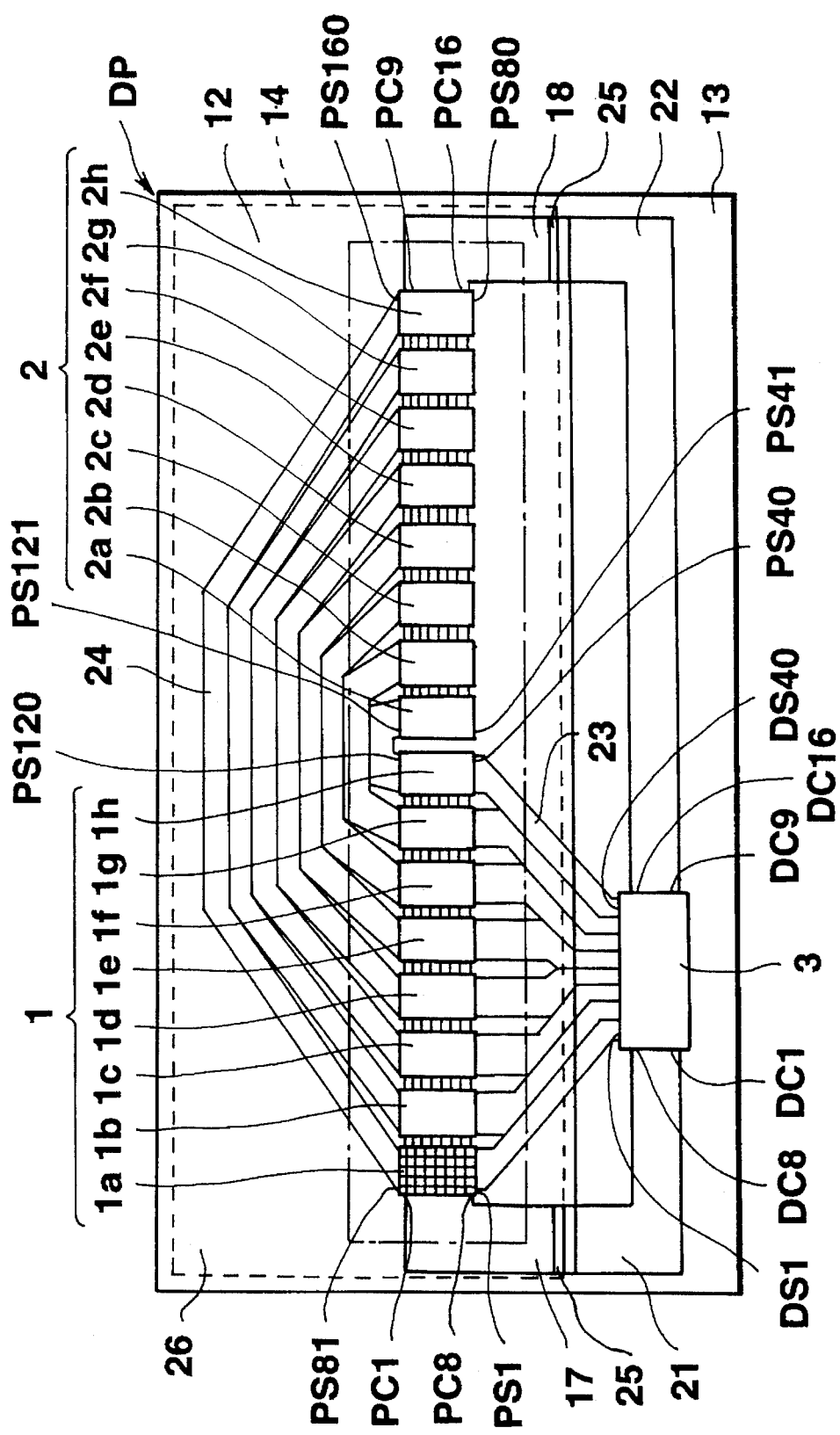
FIG. 1 is a schematic diagram showing a liquid crystal display device which is the first embodiment of the invention.
Figure 2:
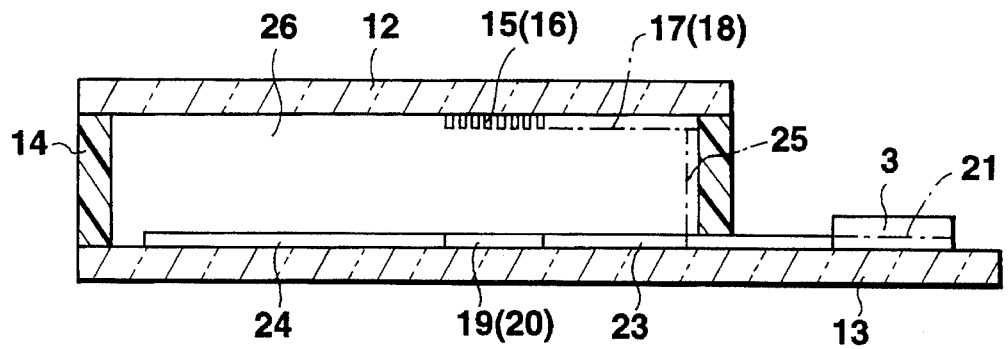
FIG. 2 is a sectional view of the display device shown in FIG. 1.

As shown in FIGS. 1 and 2, the liquid crystal display device DP includes a display pannel which has two rectangular, transparent glass substrates 12 and 13 positioned one above the other and parallel to each other. The lower glass substrate 13 is slightly larger than the upper glass substrate 12.

Figure 3:
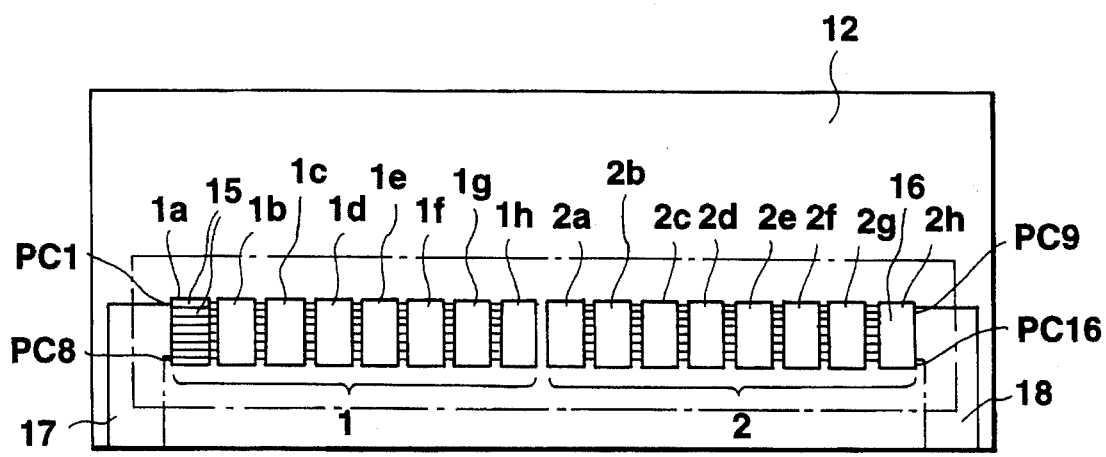
FIG. 3 is a schematic diagram depicting the upper glass substrate of the display device shown in FIG. 1.

As illustrated in FIG. 3, eight scan electrodes 15 are mounted on lower surface of the upper glass substrate 12, more precisely on the left half of the glass substrate 12, and extend parallel to one another in a row direction. They are provided for a first display area 1. The scan electrodes 15 have scan terminals PC1 to PCS, which are connected to eight scan lines 17, respectively. The scan lines 17 are made of transparent electrically conductive material. The scan lines 17 extend from the scan terminals PC1 to PC8 to the rear side (in FIG. 3, lower side) of the upper glass substrate 12.

Another eight scan electrodes 16 are mounted on lower surface of the upper glass substrate 12, more correctly on the right half of the glass substrate 12, and extend parallel to one another in the row direction. They are provided for a second display area 2. These scan electrodes 16 have scan terminals PC9 to PC16, which are connected to eight scan lines 18, respectively. The scan lines 18 are made of transparent electrically conductive material. The scan lines 18 extend from the scan terminals PC9 to PC16 to the lower side of the upper glass substrate 12.

Figure 4:
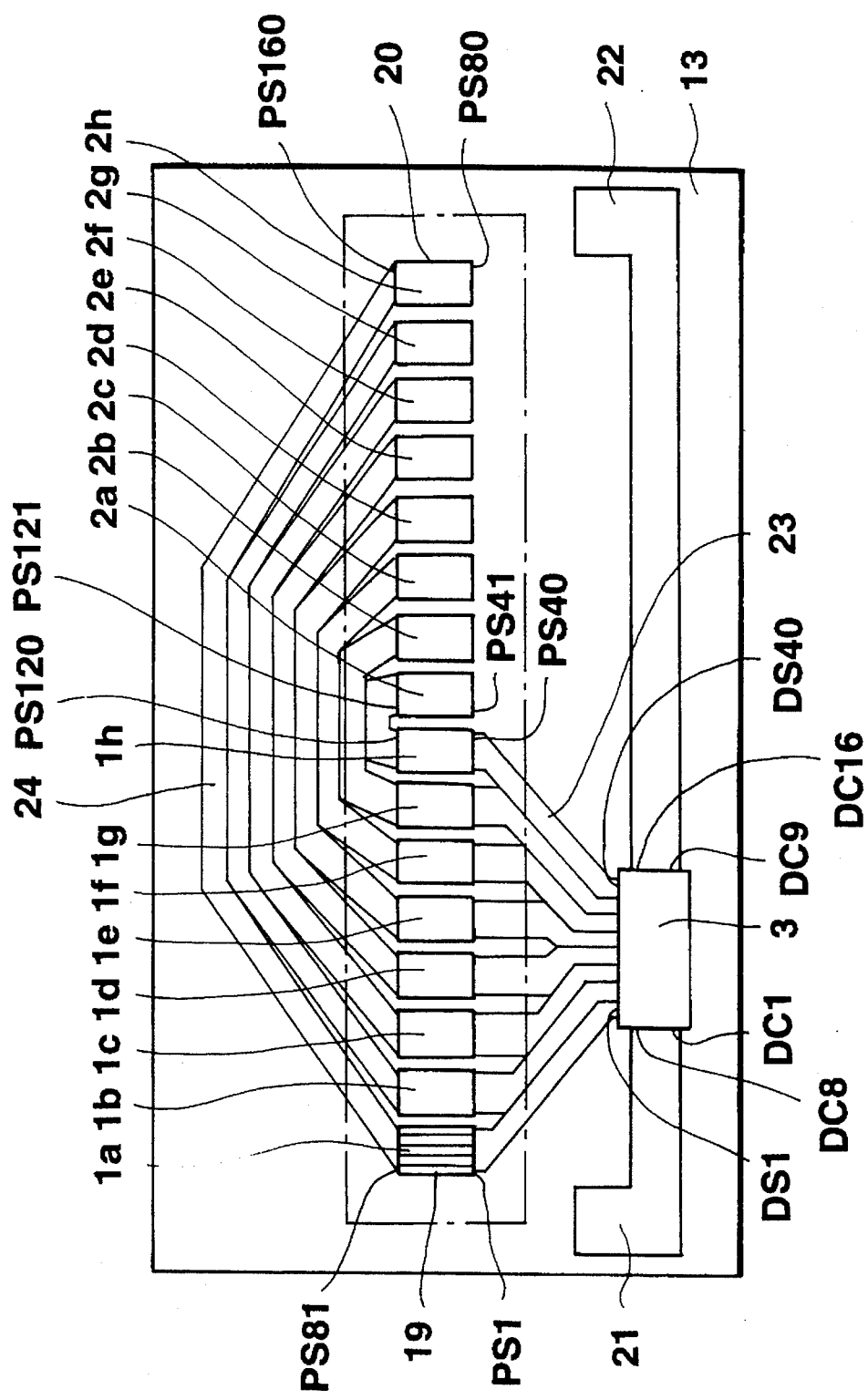
FIG. 4 is a schematic diagram depicting the lower glass substrate of the display device shown in FIG. 1.

As shown in FIGS. 2 and 4, the lower glass substrate 13 is as long as and broader than the upper glass substrate 12. Eight sets of five signal electrodes 19 are provided on the upper surface of the lower glass substrate 13, for the first display area 1. More specifically, these signal-electrode sets are arranged in a row on the left half of the glass substrate 13. Each set consists of five signal electrodes 19 which extend parallel to one another in the column direction.

As shown in FIG. 4, too, another eight sets of signal electrodes 20 are provided on the upper surface of the lower glass substrate 13, for the second display area 2. To state more precisely, these signal-electrode sets are arranged in a row on the right half of the glass substrate 13. Each set includes of five signal electrodes 20 which extend parallel to one another in the column direction.

As shown in FIGS. 1 to 4, the liquid crystal display device DP further comprises a driving circuit 3. As best shown in FIG. 2, the driving circuit 3 is mounted directly on the rear-left part of the lower glass substrate 13, in so-called "face down fashion". The driving circuit 3 is provided for driving both display areas 1 and 2. The driving circuit 3 has signal terminals DS1 to DS40 at the front side facing the display areas 1 and 2, scan terminals DC1 to DC 8 at the left side, and scan terminals DC9 to DC16 at the right side as shown in FIG. 4. The signal terminals DS1 to DS40 are connected to the signal terminals PS1 to PS40 of the signal electrodes 17 of the first display area 1, by means of signal lines 23 made of transparent electrically conductive material such as ITO and deposited on the substrate 13.

Eight scan lines 21 are arranged on the upper surface of the lower glass substrate 13, on the left side of the driving circuit 3. The scan lines 21 are connected at one end to the scan terminals DC1 to DC8, and extend to a point near a seal member 14 shown in FIG. 1. Another eight scan lines 22 are arranged on the upper surface of the lower glass substrate 13, on the right side of the driving circuit 3. These scan lines 22 are connected at one end to the scan terminals DC9 to DC16, and extend to a point near the sealing member 14.

As shown in FIGS. 1, 2 and 4, the liquid crystal display device DP has eight sets of interconnecting lines 24. Each set includes of five interconnecting lines 24 which are made of transparent electrically conductive material such as ITO. The interconnecting lines 24 are arranged on the upper surface of the lower glass substrate 13. The interconnecting lines 24 connect the signal terminals PS81 to PS120 integral with the signal electrodes 19 of the first display area 1 and located remote from the driving circuit 3, to the signal terminals PS160 to PS 121 integral with the signal electrodes 20 of the second display area 2 and located remote from the driving circuit 3.

As illustrated in FIG. 2, the sealing member 14 has a rectangular-frame shape and bonds the glass substrates 12 and 13 together. The upper glass substrate 12, the lower glass substrate 13 and the sealing member 14 define a space, which is filled with a liquid crystal 26. The molecules of the liquid crystal 26 are orientated in a specific direction when an electric field is applied to the liquid crystal 26.

Two sets of conductors 25 are provided on the inner surface of the sealing member 14 and located at the left-end and right-end portions thereof, respectively. Each set of conductors 25 includes of eight conductors formed by printing strips of an electrically conductive paste such as silver paste. The conductors 25 of the first set connect the scan lines 17 provided on the upper glass substrate 12 to the scan lines 21 in accordance with the scan lines 17, provided on the lower glass substrate 13. The conductors 25 of the second set connect the scan lines 18 provided on the upper glass substrate 12 to the scan lines 22 in accordance with the scan lines 18, provided on the lower glass substrate 13. As a result of this, the driving circuit 3 is electrically conducted to the scan electrodes 15 provided for the first display area 1 and also to those 16 provided for the second display area 2.

The scan electrodes 15 for the first display area 1 extend at right angles to the signal electrodes 19 provided for the first display area 1. So do the scan electrodes 16 for the second display area 2 extend at right angles to the signal electrodes 20 provided for the second display area 2. Hence, the driving circuit 3 can form a electric field on any portion of the liquid crystal 26 that is sandwiched between one scan electrode 15, 16 and one signal electrode 19, 20 by applying voltages to scan electrode 15, 16 and to signal electrodes 19, 20.

The first display area 1 has eight picture sections $1a$ to $1h$ arranged in a row. Similarly, the second display area 2 has eight picture sections $2a$ to $2h$ arranged in a row. Each picture section of either display area comprises five signal electrodes 20 and eight scan electrodes 16. Thus, forty pixels which are those portions of the liquid crystal 26 which are located at the intersections of the five signal electrodes 20 and the eight scan electrodes 16, are formed in each picture section. The forty pixels are arranged in eight columns and five rows, forming an 8×5 matrix.

Figure 5:
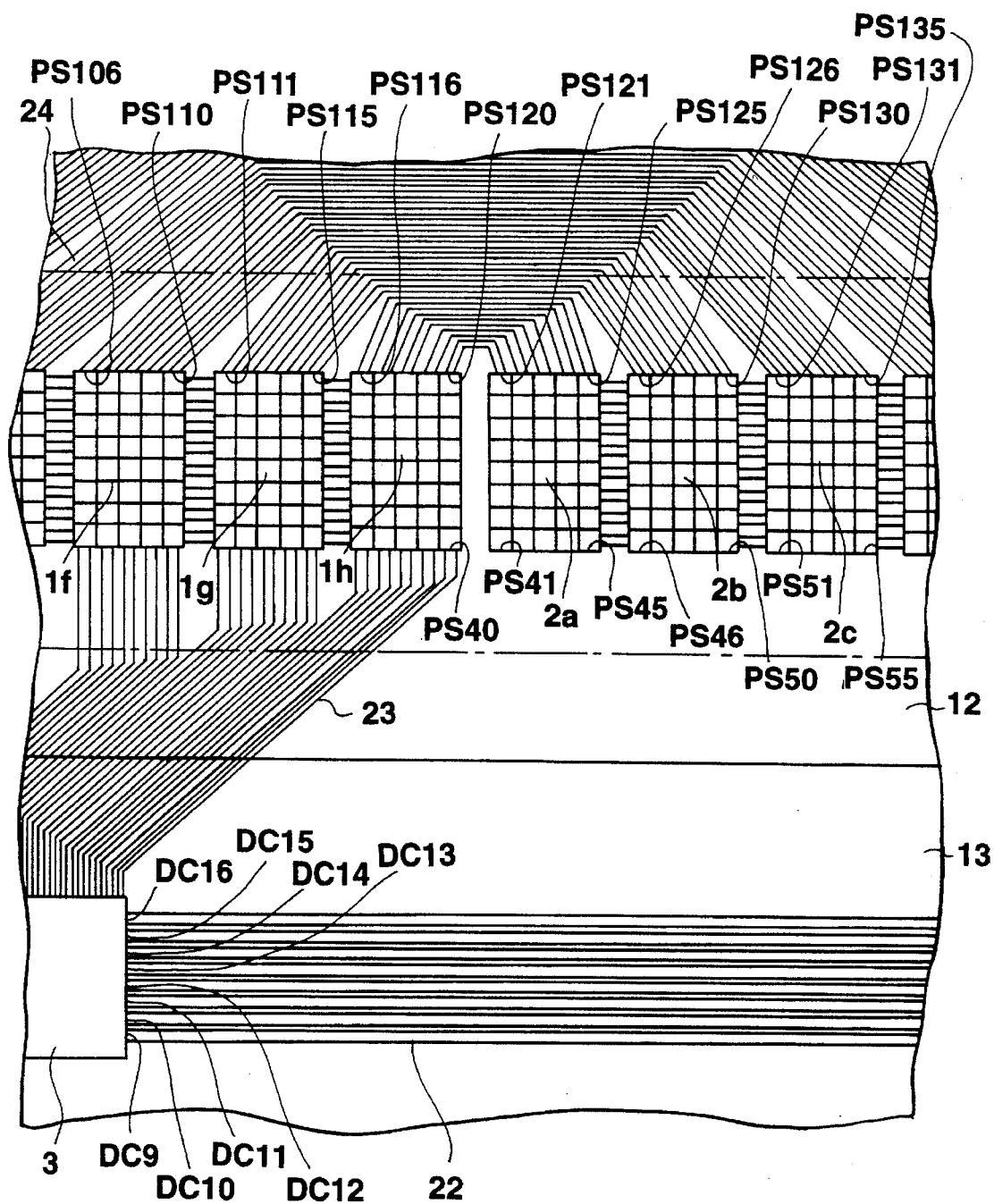
FIG. 5 is an enlarged view showing a part of the display device shown in FIG. 1.

As shown in detail in FIG. 5, the interconnecting lines 24 connect the signal terminals PS81 to PS120 of the first display area 1 to the signal terminals PS160 to PS121 of the second display area 2, in one-to-one correspondence (FIG. 5 shows only terminals PS105 to PS136). More specifically, the lines 24 of the last set, for example, connect the signal terminals PS116 to PS120 of the electrodes 19 of the picture section 1h to the signal terminals PS125 to PS121 of the electrode 20 of the picture section 2a. For another example, the lines 24 of the penultimate set connect the signal terminals PS111 to PS115 of the electrodes 19 of the picture section 1g to the signal terminals PS130 to PS126 of the electrodes 20 of the picture section 2b.

The liquid crystal display device DP may further comprise two polarizing plates, if necessary—one outside the upper glass substrate 12 and the other outside the lower glass substrate 13.

A method of driving the display device DP, i.e., the first embodiment of the invention, will now be explained.

Scan signals output from the scan terminals DC1 to DC8 of the driving circuit 3 are supplied through the scan lines 17 and 21 to the scan terminals PC1 to PC8 of the first display area 1. Simultaneously, segment signals are supplied from the signal terminals DS1 to DS40 of the driving circuit 3 through the signal lines 23 to the signal terminals PS1 to PS40 of the picture sections 1a to 1h which constitute the first display area 1. As a result, the first display area 1 displays eight characters. Next, scan signals output from the scan terminals DC9 to DC16 of the driving circuit 3 are supplied via the scan lines 18 and 22 to the scan terminals PC9 to PC16 of the second display area 2. At the same time, segment signals are supplied from the signal terminals DS40 to DS1 of the driving circuit 3 to the signal terminals PS121 to PS160 of the picture sections 2a to 2h constituting the second display area 2 through the signal lines 23, the signal terminals PS1 to PS40 of the first display area 1, the signal electrode 19 of the picture section 1a to 1b, the signal terminals PS81 to PS120 of the first display area 1, and the interconnecting lines 24. The second display area 2 thereby displays eight characters.

As described above, the signal terminals DS1 to DS40 of the driving circuit 3 are connected by the signal lines 23 to the signal terminals PS1 to PS40 of the first display area 1, and the signal terminals PS81 to PS120 of the first display area 1 are connected by the interconnecting lines 24 to the signal terminals PS160 to PS121 of the second display area 2, respectively. On the upper surface of the lower glass substrate 13, the signal lines 23 are arranged in one region, whereas the interconnecting lines 24 are arranged in another region. The signal lines 23 are arranged so closely to each other without intersecting the interconnecting lines 24. Hence, the driving circuit 3 can be mounted directly on the upper surface of that part of the lower glass substrate 13 which projects downwards (FIG. 1) in spite of the high density of the signal lines 23. On the lower surface of the upper glass substrate 12, there are arranged the scan lines 17 and 18. On the upper surface of the lower glass substrate 13, there are arranged the scan lines 21 and 22, the signal lines 23 and the interconnecting lines 24. The scan lines 17, 18, 21 and 22, the signal lines 23 and the interconnecting lines 24 suffice to electrically connect the driving circuit 3 to the 16 picture sections 1a to 1h and 2a to 2h. In other words, the driving circuit 3 can be electrically connected to both display areas 1 and 2, without using flexible substrates 5, 6, 8 and 10 as in the conventional liquid crystal display device illustrated in FIG. 9. The liquid crystal display device DP comprises less components to be connected together, and can be manufactured by performing less steps of connecting such components.

Figure 6:
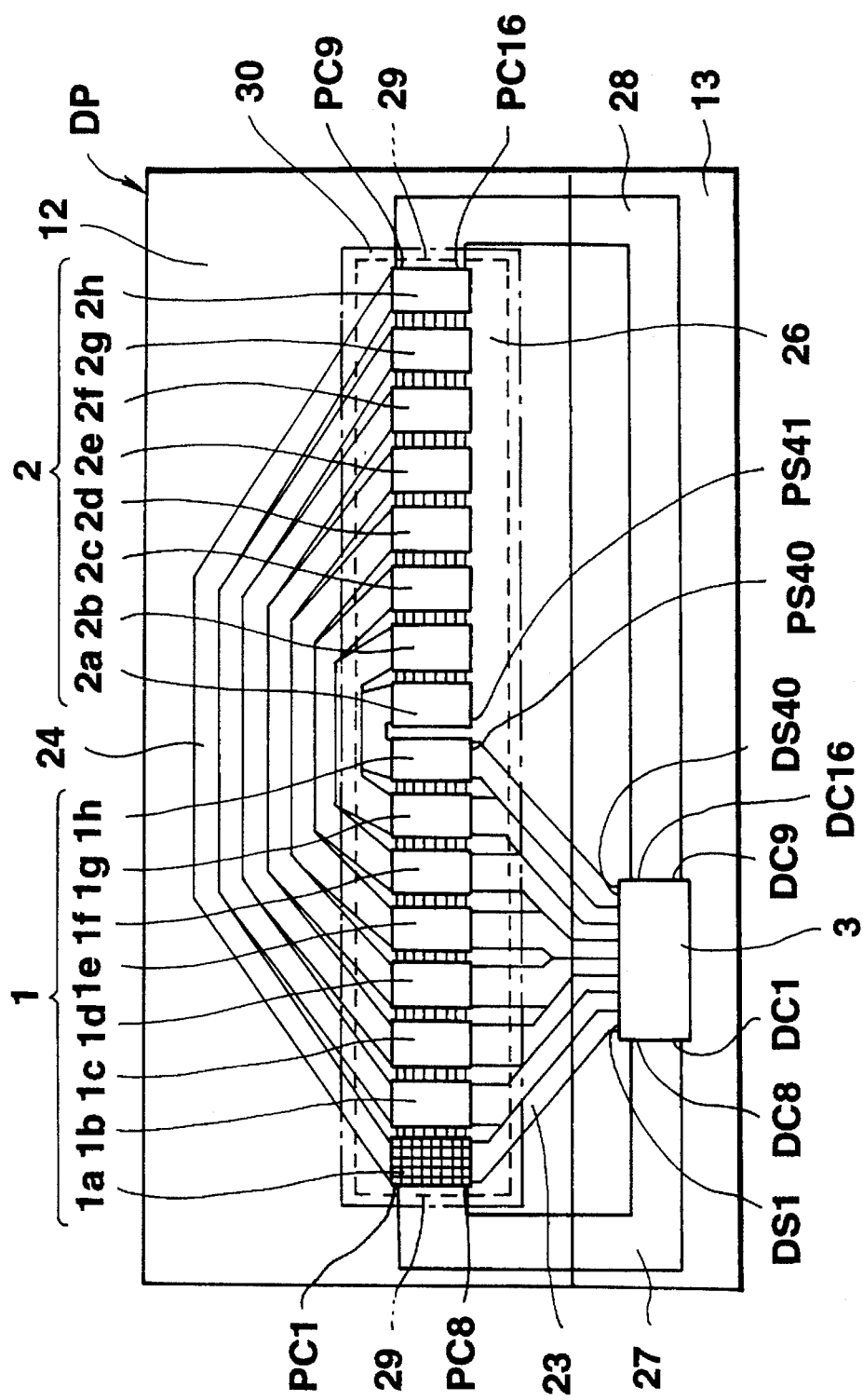
FIG. 6 is a schematic diagram showing a liquid crystal display device which is a modification of the first embodiment of the invention.

As shown in FIG. 6, the sealing member 14 may be replaced by a sealing member 30 which is narrower than the sealing member 14. The sealing member 30 is so positioned that most of the interconnecting lines 24 protrude from the member 30. The use of this narrow sealing member 30 reduces the required amount of the liquid crystal 26 and the time of filling the liquid crystal 26 in a space between both the substrates 12, 13 and the sealing member 30. The use of the sealing member 30 is desirable in that a polarizing plate, if incorporated in the device DP, needs only to be as large as the layer of the liquid crystal 26. In the liquid crystal display device DP shown in FIG. 6, the scan lines 27 connected to the scan terminals DC1 to DC8 of the driving circuit 3 are connected to the scan terminals PC1 to PC8 of the first display area 1 by means of a set of conductors 29 provided on the inner surface of the sealing member 30 and located at the left-end of the member 30, and the scan lines 28 connected to the scan terminals DC9 to DC16 of the driving circuit 3 are connected to the scan terminals PC9 to PC16 of the second display area 2 by means of another set of conductors 29 provided on the inner surface of the sealing member 30 and located at the right-end of the member 30.

A liquid crystal display device which is the second preferred embodiment of the invention will be described, with reference to FIG. 7. The components shown in FIG. 7, which are similar or identical to those of the first embodiment shown in FIG. 1, are designated by the same reference numerals and will not be described in detail.

Figure 7:
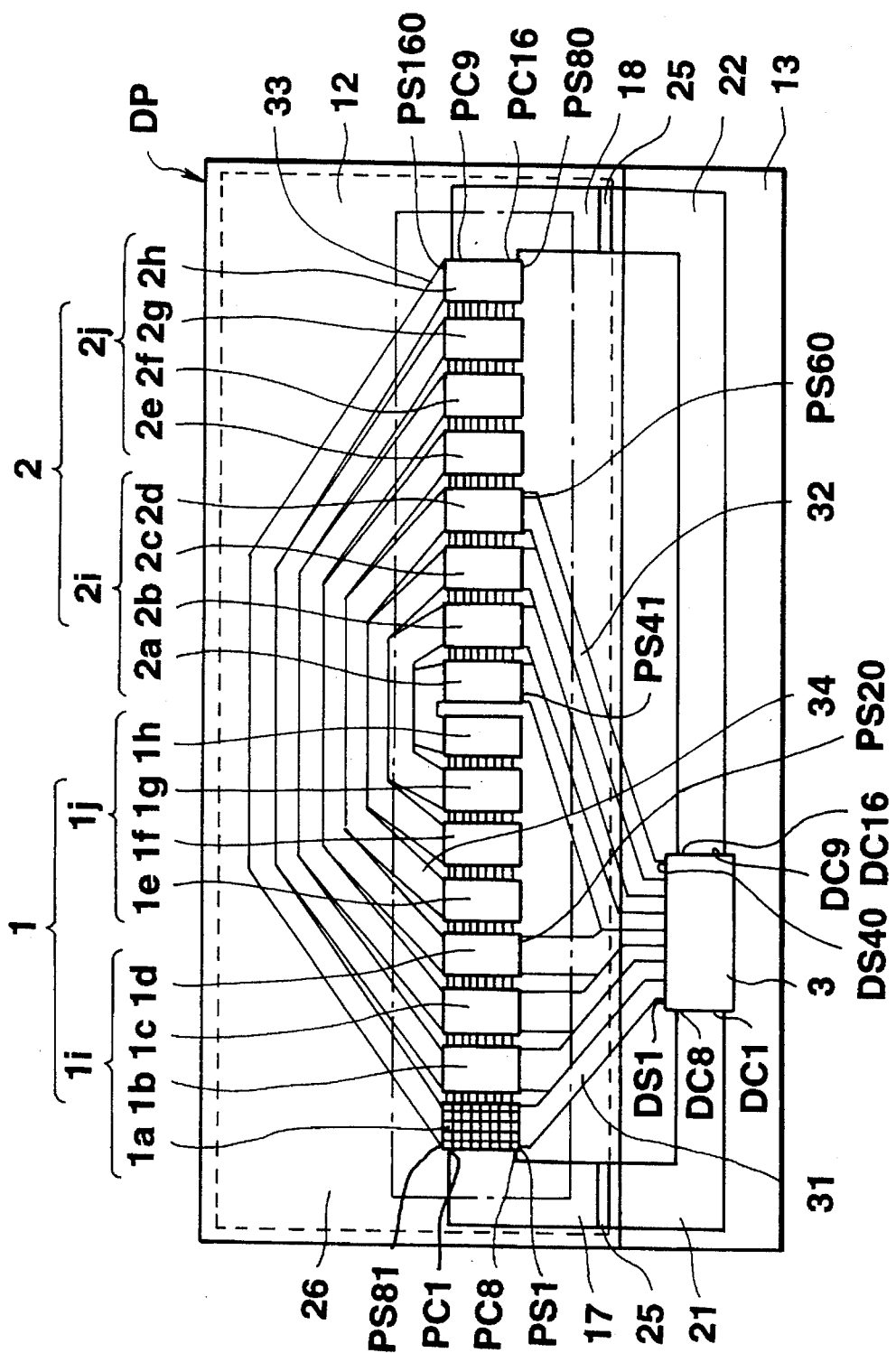
FIG. 7 is a schematic diagram showing a liquid crystal display device which is the second embodiment of the invention.

As shown in FIG. 7, the second embodiment comprises two display areas 1 and 2. The first display area 1 has eight picture sections 1a to 1h, and the second display area 2 has eight picture sections 2a to 2h. The picture sections 1a to 1d constitute a first display portion (or, a first display unit) 1i, the picture sections 1e to 1h a second display portion (or, a second display portion) 1j, the picture sections 2a to 2d a third display portion (or, a third display unit) 2i, and the picture sections 2e to 2h a fourth display portion (or, a fourth display unit) 2j. In other words, the first display area 1 has two display portions 1i and 1j of display areas, each section including four picture sections; and the second display area 2 has two display portions 2i and 2j, each section consisting of four picture sections.

The picture sections 1a to 1h and 2a to 2h are arranged in a single row on the upper surface of the front portion of a lower glass substrate 13. A driving circuit 3 is mounted also on the upper surface of the rear portion of the lower glass substrate 13. Twenty signal lines 31 and twenty signal lines 32 are provided on the upper surface of the glass substrate 13, too, and are located between the driving circuit 3 and the display areas 1 and 2. The signal lines 31 electrically connect the signal terminals DS1 to DS20 of the driving circuit 3 to the signal terminals PS1 to PS20 of the picture sections 1a to 1d of the first portion 1i. The signal lines 32 electrically connect the signal terminals DS21 to DS40 of the driving circuit 3 to the signal terminals PS41 to PS60 of the picture sections 2a to 2d of the third portion 2i. Further, twenty interconnecting lines 33 and twenty interconnecting lines 34 are provided on the upper surface of the lower glass substrate 13 and located on that side of the display areas 1 and 2 which face away from the driving circuit 3. The interconnecting lines 33 electrically connect the signal terminals PS81 to PS100 of the picture sections 1a to 1d forming the first portion 1i to the signal terminals PS160 to PS141 of the picture sections 2e to 2h forming the fourth portion 2j. On the other hand, the interconnecting lines 34 electrically connect the signal terminals PS101 to PS120 of the picture sections 1e to 1h forming the second portion 1j to the signal terminals PS121 to PS140 of the picture sections 2a to 2d forming the third portion 2i. A method of driving the display device DP shown in FIG. 7, which is the second embodiment of the invention, will now be explained.

First, scan signals output from the scan terminals DC1 to DC8 of the driving circuit 3 are supplied via the scan lines 17 and 21 to the scan terminals PC1 to PC8 of the first display area 1. Simultaneously, twenty segment signals are sequentially supplied in a forward direction, from the signal terminals DS1 to DS20 of the driving circuit 3 through the signal lines 31 to the signal terminals PS1 to PS20 of the picture sections 1a to 1d forming the first display portion 1i. Further, another twenty segment signals are sequentially supplied from the signal terminals DS40 to DS21 of the driving circuit 3 to the signal terminals PS101 to PS120 of the picture sections 1e to 1h constituting the second display portion 1j, through the signal lines 32, the signal electrodes 20 of the picture sections 2d to 2a and the interconnecting lines 34. As a result, the first display area 1, which has the picture sections 1a to 1h, displays eight characters. At this time, no scan signals are supplied from the scan terminals DC9 to DC16 of the driving circuit 3 via the scan lines 18 and 22 to the scan terminals PC9 to PC16 of the second display area 2. Therefore, the second display area 2 displays no characters at all.

Next, scan signals output from the scan terminals DC9 to DC16 of the driving circuit 3 are supplied through the scan lines 18 and 22 to the scan terminals PC9 to PC16 of the second display area 2. At the same time, twenty segment signals are sequentially supplied in a forward direction, from the signal terminals DS21 to DS40 of the driving circuit 3 through the signal lines 32 to the signal terminals PS41 to PS60 of the picture sections 2a to 2d constituting the third display portion 2i. Further, another twenty segment signals are sequentially supplied from the signal terminals DS20 to DS1 of the driving circuit 3 to the signal terminals PS141 to PS160 of the picture sections 2e to 2h constituting the fourth display portion 2j, through the signal lines 31, the signal electrodes 19 of the picture sections 1d to 1a and the interconnecting lines 33. As a result of this, the second display area 2, which has the picture sections 2a to 2h, displays eight characters. At this time, scan signals are no longer supplied from the scan terminals DC1 to DC8 of the driving circuit 3 through the scan lines 17 and 21 to the scan terminals PC1 to PC8 of the first display area 1. Hence, the first display area 1 displays no characters at all.

As shown in FIG. 7, on the upper surface of the lower glass substrate 13, the signal lines 31 and 32 are arranged in one region, whereas the interconnecting lines 33 and 34 are arranged in another region. The signal lines 31 and 32 therefore do not intersect with the interconnecting lines 33 and 34. Hence, the driving circuit 3 can be mounted directly on the upper surface of that part of the lower glass substrate 13 which projects downwards. On the lower surface of the upper glass substrate 12, there are arranged the scan lines 17 and 18. The scan lines 17, 18, 21 and 22, the signal lines 31 and 32 and the interconnecting lines 33, 34 suffice to connect the driving circuit 3 to the 16 picture sections 1a to 1h and 2a to 2h. In other words, the driving circuit 3 can be electrically connected to both display areas 1 and 2, without using flexible substrates. Hence, like the first embodiment (FIG. 1), the display device DP according to the second embodiment (FIG. 7) comprises less components to be connected together, and can be manufactured by performing less steps of connecting such components.

In the first and second embodiments, sixteen picture sections 1a to 1h and 2a to 2h are arranged in a row. Nonetheless, more or less picture sections can be arranged in a row. Further, the number of picture sections need not be even. An odd number of picture sections may be used. If an odd number of picture sections are arranged in a row, they are divided into two sets, one for the first display area having some of the picture sections and the other for the second display area having the other of the picture sections less than the some of them; the signal terminals of the picture sections of the first display area are connected to the signal terminals of the driving circuit by signal lines located on that side of both display areas which faces the driving circuit, and the other signal terminals of the picture sections of the first display area are connected to the signal terminals of the picture sections of the second display area by interconnecting lines arranged on the side of both display areas which faces away from the driving circuit.

In the embodiments described above, the driving circuit 3 has signal terminals DS1 to DS40 at the side opposing the first display areas 1 and 2, one set of scan terminals DC1 to DC8 at the left side, and another set of scan terminals DC9 to DC16 at the right side. Instead, the signal terminals DS1 to DS40 may be provided at any other side of the circuit 3, while the two sets of scan terminals are provided at two opposing sides, respectively, which are continuous to said side.

In the embodiments, the driving circuit 3, i.e., a semiconductor chip, is attached to the upper surface of the lower glass substrate 13. The chip may be replaced by a semiconductor circuit fabricated on the glass substrate 13 by means of, for example, thin-film forming technique.

As has been described above, the first and second embodiments have a plurality of display areas, each including of a plurality of picture sections provided on a substrate. The picture sections of each display area are connected to a driving circuit by a set of scan lines, while those of any other display area are connected to the driving circuit by another set of scan lines. Furthermore, some of the picture sections of each display area are connected to the driving circuit by a set of signal lines, while the other picture sections of the display area are connected to the picture sections of another display area by interconnecting lines. The signal lines therefore do not intersect with the interconnecting lines on the substrate. Hence, the driving circuit can be mounted directly on the substrate and can be connected to the picture sections by the scan lines, the signal lines and the interconnecting lines—all arranged on the substrate. Thus, no flexible substrates need to be used to connect the driving circuit to the picture sections. As a result, the first and second embodiments can be a liquid crystal display device each which comprises a small number of components to be connected together and which can be manufactured by performing a small number of steps of connecting such components.

The third preferred embodiment of the present invention will now be described, with reference to FIG. 8 which is a schematic diagram showing the display device. The components shown in FIG. 8, which are similar or identical to those of the first embodiment shown in shown in FIG. 1, are designated at the same reference numerals and will not be described in detail.

Figure 8:
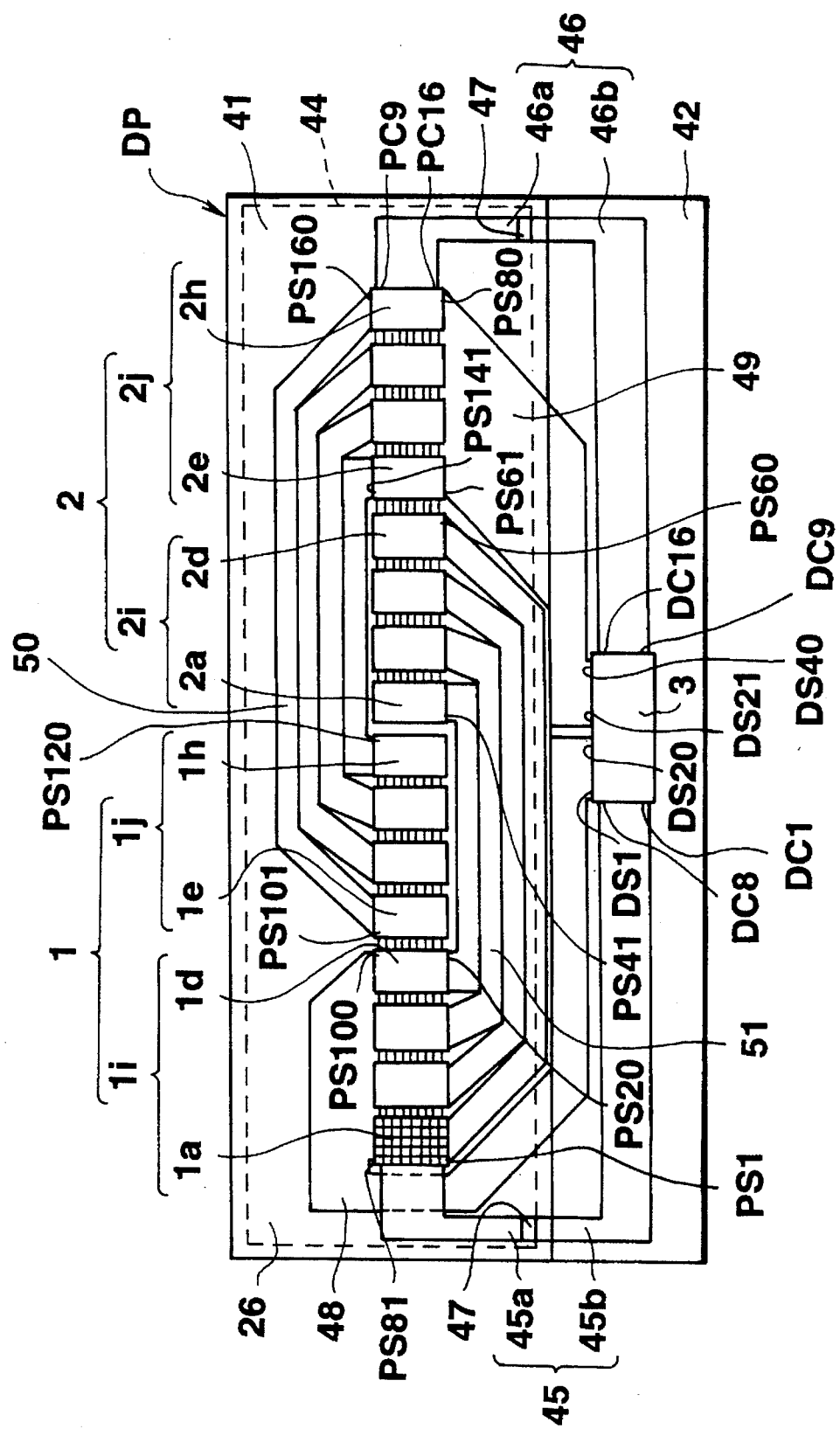
FIG. 8 is a schematic diagram showing a liquid crystal display device which is the third embodiment of the invention.

The display device DP shown in FIG. 8 comprises two glass substrates 41 and 42, located one above the other, liquid crystal 26 sealed in the space between the glass substrates 41 and 42, and 16 picture sections 1a to 1h and 2a to 2h arranged in a row. The glass substrates 41 and 42 have the same length and different widths. The lower glass substrate 42 is about twice as broad as the upper glass substrate 41. The glass substrates 41 and 42 are so positioned that their upper (front) sides are aligned. A sealing member 44 is interposed between the glass substrates 41 and 42, preventing the liquid crystal 26 from leaking out of the space between the glass substrates 41 and 42. Each of the picture sections 1a to 1h and 2a to 2h has 40 pixels which are arranged in 8 columns and 5 rows.

Since the lower glass substrate 42 is about twice as broad as the upper glass substrate 41 and has its front side aligned with that of the upper glass substrate 41, its rear half protrudes from the rear side of the upper glass substrate 41. A driving circuit 3 is mounted directly on the upper surface of the rear half of the glass substrate 42, in so-called "face down fashion." The driving circuit 3 is provided for driving both display areas 1 and 2. The driving circuit 3 is a rectangular semiconductor chip designed to drive the picture sections 1a to 1h and 2a to 2h.

As shown in FIG. 8, of the 16 picture sections arranged in a row, the sections 1a to 1h constitute a first display area (or, display section) 1 and the remaining sections 2a to 2h constitute a second display area (or display section) 2.

Eight scan electrodes (not shown) are mounted on the lower surface of the upper glass substrate 41, more precisely on the left half of the glass substrate 41, and extend parallel to one another in a row direction. They are provided for the first display area 1 and have scan terminals PC1 to PC8 at their left ends. The scan terminals PC1 to PC8 are connected to eight scan lines 45, respectively. The scan lines 45 extend from the scan terminals PC1 to PC8 to the lower side of the upper glass substrate 41. Another eight scan electrodes (not shown) are mounted on lower surface of the upper glass substrate 41, more specifically on the right half of the glass substrate 41, and extend parallel to one another in the row direction. They are provided for the second display area 2. These scan electrodes have scan terminals PC9 to PC16 at their right ends. The scan terminals PC9 to PC16 are connected to eight scan lines 46, respectively. The scan lines 46 extend from the scan terminals PC9 to PC16 to the lower side of the upper glass substrate 41.

The scan lines 45 include of eight scan line 45a provided on the lower surface of the upper glass plate 41 and eight scan lines 45b provided on the upper surface of the lower glass substrate 42. The scan lines 45a are connected to the scan lines 45b at the lower-left corner of the sealing member 44 by an electrically conductive paste such as silver paste. The scan lines 46 include of eight scan line 46a provided on the lower surface of the upper glass plate 41 and eight scan lines 46b provided on the upper surface of the lower glass substrate 42. The scan lines 46a are connected to the scan lines 46b at the lower-right corner of the sealing member 44 by an electrically conductive paste such as silver paste.

The picture sections 1a to 1d constitute a first display portion 1i, and the picture sections 1e to 1h a second display portion 1j. The picture sections 2a to 2d constitute a third display portion 2i, and the picture sections 2e to 2h a fourth display portion 2j. In other words, the first display area 1 has two display portions 1i and 1j of display areas, each section including four picture sections; and the second display area 2 has two display portions 2i and 2j, each portion including four picture sections.

Two sets of signal lines 48 are provided on the upper surface of the lower glass substrate 42. Each set includes of twenty signal lines. The signal lines 48 of the first set electrically connect the signal terminals DS1 to DS20 of the driving circuit 3 to the signal terminals PS81 to PS100 of the picture sections 1a to 1d of the first portion 1i. The signal lines 49 of the second set electrically connect the signal terminals DS21 to DS40 of the driving circuit 3 to the signal terminals PS61 to PS80 of the picture sections 2e to 2h of the fourth set 2j.

Further, two sets of interconnecting lines 50 and 51, each including of twenty lines, are provided on the upper surface of the lower glass substrate 42. The interconnecting lines 50 of the first set are located on that side of the display areas 1 and 2 which face away from the driving circuit 3. The interconnecting lines 51 of the second set are located on that side of the display areas 1 and 2 which faces the driving circuit 3. The interconnecting lines 50 electrically connect the signal terminals PS101 to PS120 of the picture sections 1e to 1h forming the second display portion 1j to the signal terminals PS160 to PS141 of the picture sections 2h to 2e constituting the fourth display portion 2j. The interconnecting lines 51 electrically connect the signal terminals PS1 to PS20 of the picture sections 1a to 1d forming the first display portion 1i to the signal terminals PS60 to PS41 of the picture sections 2a to 2d forming the third display portion 2i.

On the upper surface of the lower glass substrate 42, the signal lines 48 of the first set, the signal lines 49 of the second set, the interconnecting lines 50 of the first set, and the interconnecting lines 51 of the second set are arranged, not overlapping one another. The signal lines 48 of the first set extend from the signal terminals DS1 to DS20, turn around the left end of the first display area 1, and are connected to the signal terminals PS81 to PS100. These terminals PS81 to PS100 are located on that side of the first display area 1 which faces away from the driving circuit 3. On the other hand, the signal lines 49 of the second set extend from the signal terminals DS21 to DS40 and are connected to the signal terminals PS61 to PS80. The terminals PS61 to PS80 are arranged on that side of the second display area 2 which faces the driving circuit 3. The interconnecting lines 51 of the second set are arranged on that side of the second display area 2 which faces the driving circuit 3, but are spaced part from the signal lines 48 and 49, connecting the signal terminals PS1 to PS20 of the picture sections 1a to 1d to the signal terminals PS41 to PS60 of the picture sections 2a to 2d. The interconnecting lines 50 of the first set are arranged on that side of the display areas 1 and 2 which faces away from the driving circuit 3, but are spaced apart from the signal lines 48 of the first set, connecting the signal terminals PS101 to PS120 of the picture sections 1e to 1h to the signal terminals PS160 to PS141 of the picture sections 2e to 2h.

As shown in FIG. 8, the signal terminals PS81 to PS100 of the first display portion 1i are connected to the signal terminals DS20 to DS1 of the drive circuit 3, respectively, and the signal terminals PS101 to 120 of the second display portion 1j are connected to the signal terminals DS40 to DS21 of the drive circuit 3, respectively. Hence, were 40 segment signals sequentially supplied in a shifting operation from the signal terminals DS1 to DS40 of the circuit 3 via the signal lines 48 and 49, and the interconnection lines 50 and 51, they would inevitably be input to the first display portion 1i and the second display portion 1j in the reverse order, making normal data display impossible. This does not happen in the third embodiment (FIG. 8) since the driving circuit 3 contains a logic circuit which sequentially outputs 40 segment signals from the signal terminals DS20 to DS1 and then the signal terminals DS40 to DS21. Eight characters can therefore be displayed by the picture sections 1a to 1h of the first display area 1.

By contrast, the signal terminals PS41 to PS80 of the third and fourth display portions 2i and 2j are connected to the signal terminals DS1 to DS40 of the drive circuit 3, respectively. Thus, 40 segment signals are supplied from the signal terminals DS1 to DS40 of the circuit 3 via the signal lines 48 and interconnecting lines 51 and via the signal lines 49, making normal data display impossible. Namely, the segment signals are input to the second display area 2 in the forward order. Eight characters can therefore be displayed by the picture sections 2a to 2h of the second display area 2.

The operation of the third embodiment will now be explained.

First, scan signals output from the scan terminals DC1 to DC8 of the driving circuit 3 are supplied through the scan lines 45 to the picture sections 1a to 1h of the first display area 1, and scan signals output from the scan terminals DC9 to DC16 of the driving circuit 3 are supplied through the scan lines 46 to the picture sections 2a to 2h of the second display area 2. These two sets of scan signals are alternately input to the display areas 1 and 2.

As the scan signals are input to the picture sections 1a to 1h of the first display area 1, segment signals are output from the signal terminals DS1 to DS40 of the driving circuit 3. Of these segment signals, the signals output from the signal terminals DS1 to DS20 are supplied via the signal line 48 to the first display portion 1i, and the signals output from the signal terminals DS21 to DS40 are supplied to the second display portion 1j through the signal lines 49, the signal electrodes of the picture sections 2e to 2h and the interconnecting lines 50. As indicated above, the logic circuit built in the driving circuit 3 sequentially outputs 20 segment signals from the signal terminals DS20 to DS1 to the signal terminals PS81 to PS100 of the first display portion 1i, and then sequentially outputs 20 segment signals from the signal terminals DS40 to DS21 to the signal terminals PS101 to PS120 of the second display portion 1j. This is because, the terminals DS1 to DS20 of the circuit 3 are electrically connected to the terminals PS100 to PS81, not PS81 to PS100, respectively, and the terminals DS21 to DS40 are electrically connected to the terminals PS120 to PS101, not PS101 to PS120, respectively. As a result of this, the segment signals output from the signal terminals DS1 to DS40 are sequentially supplied to the signal terminals PS1 to PS40 of the picture sections 1a to 1h of the first display area 1, whereby the first display area 1 displays eight characters.

Further, as the scan signals are input to the picture sections 2a to 2h of the second display area 2, segment signals are output from the signal terminals DS1 to DS40 of the driving circuit 3. Of these segment signals, the signals output from the signal terminals DS1 to DS20 are supplied to the third display portion 2i through the signal line 48, the signal electrodes of the picture sections 1a to 1d and the interconnecting lines 51, and the signals output from the signal terminals DS21 to DS40 are supplied to the fourth display portion 2j through the signal lines 49. As described above, the terminals DS1 to DS20 of the circuit 3 are electrically connected to the terminals PS41 to PS60, respectively, and the terminals DS21 to DS40 are electrically connected to the terminals PS61 to PS80, respectively. As a result, the segment signals output from the signal terminals DS1 to DS40 are sequentially supplied to the signal terminals PS41 to PS80 of the picture sections 2a to 2h of the second display area 2, respectively, whereby the second display area 2 displays eight characters.

In the third embodiment having four display portions 1i, 1j, 2i and 2j, the signal lines 48 connect the signal terminals DS1 to DS20 of the driving circuit 3 to the first display portion 1i, and the signal lines 49 connect the signal terminals DS21 to DS40 of the driving circuit 3 to the fourth display portion 2j. Furthermore, the interconnecting lines 51 connect the first display portion 1i to the third display portion 2i, and the interconnecting lines 50 connect the second display portion 1j to the fourth display portion 2j. As clearly shown in FIG. 8, the signal lines 48 extend from the terminals DS1 to DS20, turn around the left end of the first display area 1, and are connected to the front side of the first display portion 1i. The signal lines 49 extend from the terminals DS21 to DS40 and are connected to the rear side of the fourth display portion 2j. The interconnecting lines 51 are arranged on the rear side of the display area 1 and 2, and the other interconnecting lines 50 on the front side thereof. Therefore, the first set of signal lines 48, the second set of signal lines 49, the first set of interconnecting lines 50, and the second set of interconnecting lines 51 do not intersect at all on the upper surface of the lower glass substrate 42. Hence, the driving circuit 3, which is a rectangular semiconductor chip, can be mounted directly on that part of the lower glass substrate 42 which projects rearwards form the rear side of the upper glass substrate 41. The signal lines 48 and 49 and the interconnecting lines 50 and 51 are provided on the upper surface of the lower glass substrate 42. The scan lines 45a and are provided on the lower surface of the upper glass substrate 41, and the scan lines 45b and 46b are provided on the upper surface of the lower glass substrate 42. The lines 45a and the lines 45b are connected, end to end, forming a first set of scan lines 45, and the lines 46a and the line 46b are connected, end to end, forming a second set of scan lines 46. The scan lines 45, 46, the signal line 48, 49, and the interconnecting lines 50, 51 electrically connect the driving circuit 3 to the 16 picture sections 1a to 1h and 2a to 2h which constitute the first and second display areas 1 and 2. Though the lines 45a on the upper substrate 41 cross the signal lines 48 on the lower substrate 42 between the liquid crystal 26, the crossing region is out of the first and second display area 1 and 2. Hence, display characteristics on the first and second display area 1 and 2 do not suffer an interference. Therefore, no such components, as the flexible substrates need to be used for connect the driving circuit to the picture sections. The third embodiment can therefore be a liquid crystal display which comprises a small number of components to be connected together and which can be manufactured by performing a small number of steps of connecting such components.

As illustrated in FIG. 8, only twice as less interconnecting lines as in the first and second embodiments are arranged on that side of the display areas 1 and 2 which faces away from the driving circuit 3. Both glass substrates 41 and 42 are therefore less broader than their counterparts of the first and second embodiments, as may be understood by comparing FIG. 8 with FIGS. 1 and 7. It follows that the liquid crystal display according to the third embodiment can be made smaller than the devices according to the first and second embodiments.

To be fit into a panel frame, the display device of this type must have two fitting edges, each provided on one side of the row of picture sections 1a to 1h and 2a to 2h and each having a width of about 3 mm. Each of the interconnecting lines 50 and 51 needs to have a width of about 0.1 mm. In the third embodiment, 20 interconnecting lines are provided on the front side of the display-section row. Thus, the front fitting edge of the third embodiment is about 2 mm wide, and those parts of the glass substrates 41 and 42 which are located on the front side of the display-section row need to have a width of only about 2 mm. This helps to reduce the size of the third embodiment.

In each of the three embodiments described above, the driving circuit 3 can be connected to the lines provided on the opposing surfaces of two glass substrates, without using a plurality of flexible substrates which must be properly portioned.

The present invention has been described, with reference to a few preferred embodiments. Nonetheless, the present invention is not limited to the embodiments. Rather, various changes and modifications can be made without departing from the scope and spirit of the invention.

In each embodiment described above, sixteen picture sections 1a to 1h and 2a to 2h are arranged in a row. More or less picture sections can be arranged in a row, instead. Further, the number of picture sections need not be even. An odd number of picture sections may be used, which are divided into two sets, one for the first display area and the other for the second display area. The first display area is divided into the first and second display portions, and the second display area is divided into the third and fourth display portions. In this case, the first display portion including of more display sections than the third display portion, or the fourth display portion including more display sections than the second display portion. Furthermore, two sets of interconnecting lines are provided—the first set including of as many lines as the signal terminals of the second display portion, and the second set including as many lines as the signal terminals of the third display portion.

In the first to third embodiments, each picture section has 40 pixels arranged in eight rows and five columns, forming an 8×5 matrix. Instead, each picture section may have a predetermined number of segment electrodes and a common electrode which opposes the segment electrodes. A voltage is applied between the common electrode and only selected ones of the segment electrodes, whereby those portions of liquid crystal which are located between the common electrode and the selected segment electrodes become opaque to display a character or the like.

In the first to third embodiments, the driving circuit 3 has signal terminals DS1 to DS40 at the side facing the row of the picture sections 1a to 1h and 2a to 2h, a first set of scan terminals DC1 to DC8 at the left side, and a second set of scan terminals DC9 to DC16 at the right side. Alternatively, the signal terminals DS1 to DS40 may be provided at the left or right side, and the first and second set of scan terminals may be located at the opposing sides which are continuous to the side where the signal terminals DS1 to DS40 are provided. In this alternative case as well, the lines connecting the circuit 3 to the picture sections do not intersect at all.

In the first to third embodiments, the driving circuit 3 is bonded to the lower glass substrate. The circuit 3 (i.e., is a semiconductor chip) may be replaced by a semiconductor circuit fabricated on the lower glass substrate by means of, for example, thin-film forming technique.

What is claimed is:

1. A liquid crystal display device comprising:

a first substrate having first and second sets of column electrodes mounted thereon, a driving circuit for applying control voltages, a plurality of column lines connecting said driving circuit to a first side of the first set of the column electrodes, said first side facing said driving circuit, a plurality of interconnecting lines connecting a second side of the first set of the column electrodes to the second set of the column electrodes, said second side facing away from said driving circuit, and a first sub-set and a second sub-set of row lines connected with said driving circuit;

a second substrate which faces said first substrate, defining a space together with said first substrate, said second substrate having first and second sets of row electrodes mounted thereon, to intersect the first and second sets of column electrodes, respectively, and having a third subset of row lines connected with the first set of the row electrodes and a fourth sub-set of row lines connected with the second set of the row electrodes;

a liquid crystal filled in said space between said first and second substrates;

a sealing member bonding said first and second substrates to each other and sealing said liquid crystal in said space between said first and second substrates, and having a first conductor for connecting the first sub-set of row lines to the third sub-set of row lines and a second conductor for connecting the second sub-set of row lines to the fourth sub-set of row lines;

a first display area defined by those portions of said liquid crystal which are located at intersections between the first set of the row electrodes and the first set of column electrodes; and a second display area defined by those portions of said liquid crystal which are located at intersections between the second set of the row electrodes and the second set of column electrodes.

2. The device according to claim 1, wherein said first and second display areas each include a plurality of picture sections defined by those portions of said liquid crystal which are located at intersections of the row electrodes of one set and the column electrodes of one set.

3. The device according to claim 2, wherein the row electrodes provided for any picture section of each display area are connected to the row electrodes provided for the picture section adjacent to said picture section.

4. The device according to claim 1, wherein said plurality of interconnecting lines and said plurality of column lines are mounted on said first substrate, the row lines of the first and second sub-sets are mounted on said first substrate, and, the row lines of the third and fourth sub-sets are mounted on said second substrate.

5. The device according to claim 1, wherein said driving circuit is mounted on said first substrate.

6. The device according to claim 1, wherein said interconnecting lines are connected to the second side of the column electrodes of the second set.

7. A liquid crystal display device comprising:

a display panel including:

an upper substrate having first and second display areas in which are arranged a plurality of row electrodes, first row lines connected to said plurality of row electrodes in the first display area, and second row lines connected to said plurality of row electrodes in the second display area;

a lower substrate having first and second display areas in which are arranged a plurality of column electrodes, a driving circuit for applying control voltages, a plurality of column lines connected to said driving circuit, a plurality of third and fourth row lines connected to said driving circuit, first interconnecting lines arranged in an opposite-side facing away from said driving circuit, connecting some of said column electrodes in the first display area to some of said column electrodes in the second display area, and second interconnecting lines connecting the other of said column electrodes in the first display area to the other of said column electrodes in the second display area;

a liquid crystal filled in said space between said upper and lower substrates; and a sealing member bonding said upper and lower substrates to each other, sealing said liquid crystal in the space between said first and second substrates, and having a first conductor for connecting the first row lines of said upper substrate to the third row lines of said lower substrate and a second conductor for connecting the second row lines of said upper substrate to the fourth row lines of said lower substrate.

8. The device according to claim 7, wherein said first display area of at least one of the upper and lower substrates is adjacent to the second display area of at least said one of said upper and lower substrates.

9. The device according to claim 7, wherein:

said second interconnecting lines are arranged at an opposite-side facing away from said driving circuit, some of said column lines connect between said driving circuit and a side facing toward said driving circuit of some of said column electrodes in the first display area, and the other of said column lines connect between said driving circuit and a side facing toward said driving circuit of others of said column electrodes in the second display area.

10. The device according to claim 7, wherein:

said second interconnecting lines are arranged on a side facing toward said driving circuit, and some of said column lines connect between said driving circuit and a side facing toward said driving circuit of some of said column electrodes in the second display area, and others of said column lines connect between said driving circuit and an opposite-side facing away from said driving circuit of others of said column electrodes in the first display area.

11. The device according to claim 7, wherein said first and second interconnecting lines and said column lines are mounted on said lower substrate, and the first and second row lines are mounted on said upper substrate.

12. A method of driving a liquid crystal display device, comprising the steps of:

providing a display panel including:

a first substrate having first and second sets of column electrodes mounted thereon, a driving circuit for applying control voltages, a plurality of column lines connecting said driving circuit to a first side of the first set of the column electrodes, said first side facing said driving circuit, a plurality of interconnecting lines connecting a second side of the first set of the column electrodes to the second set of the column electrodes, said second side facing away from said driving circuit, and a first sub-set and a second sub-set of row lines connected with said driving circuit;

a second substrate which faces said first substrate, defining a space together with said first substrate, said second substrate having first and second sets of row electrodes mounted thereon, to intersect the first and second sets of column electrodes, respectively, and having a third subset of row lines connected with the first set of the row electrodes and a fourth sub-set of row lines connected with the second set of the row electrodes;

a liquid crystal filled in said space between said first and second substrates;

a sealing member bonding said first and second substrates to each other, sealing said liquid crystal in said space between said first and second substrates, and having a first conductor for connecting the first sub-set of row lines to the third sub-set of row lines and a second conductor for connecting the second sub-set of row lines to the fourth sub-set of row lines;

a first display area defined by those portions of said liquid crystal which are located at intersections between the first set of the row electrodes and the first set of the column electrodes; and a second display area defined by those portions of said liquid crystal which are located between the second set of the row electrodes and the second set of column electrodes;

applying row voltages from said driving circuit to the first set of the row electrodes and the second set of the row electrodes, alternately;

applying column voltages from said driving circuit to the first set of the column electrodes as said row voltages are applied to the first set of the row electrodes; and applying the column voltages from said driving circuit to the second set of the column electrodes through said plurality of column lines, the first set of the column electrodes and said plurality of interconnecting lines as said row voltages are applied to the second set of the row electrodes.

13. The method according to claim 12, wherein said step of applying the column voltages from said driving circuit to the first set of the column electrodes and said step of applying the column voltages from said driving circuit to the second set of the column electrodes applies said voltages such that the voltages are inversely and alternately shifted.

* * * * *